April 7, 1936. J. S. DURNELL ET AL 2,036,929
AIR HUMIDIFYING DEVICE
Filed Aug. 10, 1934
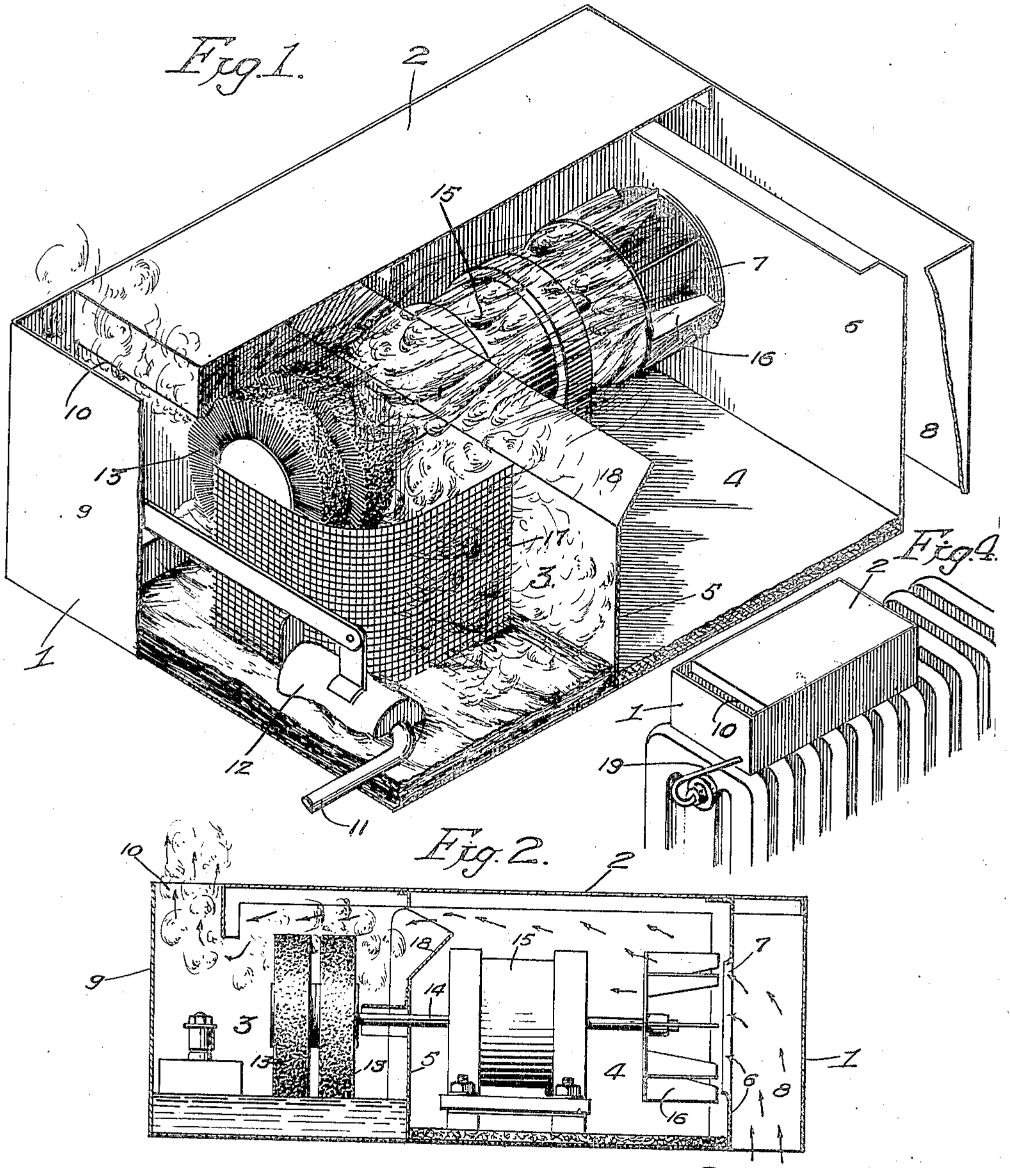
Fig. 1. Fig. 2. Fig. 4.
Fig. 3.
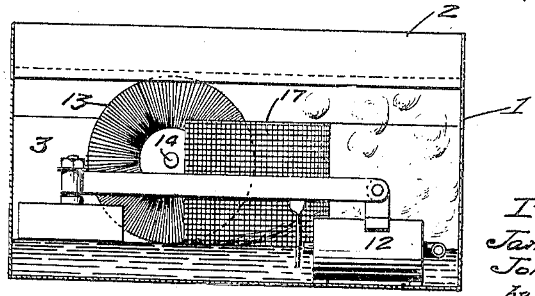
Inventors.
James S. Durnell
John A. Tifft
by their Attorneys
Howson & Howson Patented Apr. 7, 1936

2,036,929

UNITED STATES PATENT OFFICE 2,036,929

AIR HUMIDIFYING DEVICE

James S. Durnell, Wyncote, and John A. Tifft, Merion, Pa., assignors to Merion Sporting Goods Manufacturing Corp., Philadelphia, Pa., a corporation of Pennsylvania Application August 10, 1934, Serial No. 739,354

3 Claims. (Cl. 261—92)

This invention relates to air-conditioning devices and, more particularly, to air-humidifying devices, the principal object being to provide an improved device of this nature which functions to supply a maximum quantity of saturated air per unit time of operation.

Another object of the invention is to provide a device of this class which is simple in construction, economic to manufacture, and efficient in operation.

A further object of the invention is to provide an air-humidifying device comprising one or more rotating brushes arranged cooperatively with the liquid in a liquid reservoir to generate therefrom a fine mist or vapor with which air to be humidified is forced into intimate association.

Still another object of the invention is to provide a device in which one or more rotating brushes arranged in cooperative relation with the liquid in a liquid reservoir set up a turbulent action and thus generate a fine mist or vapor, and air to be moistened or humidified is forced into intimate contact with the generated mist or vapor in a predetermined direction to effect maximum saturation of the air.

A still further object of the invention is to provide a device of this nature including means for breaking up any sizeable particles of liquid which might be formed by the generation of the mist.

Other objects and features of the invention will be apparent as the description proceeds.

In the accompanying drawing:

Fig. 1 is a perspective view of the air-humidifying device with the casing thereof broken away to disclose the contained parts;

Fig. 2 is a sectional view taken longitudinally of the device;

Fig. 3 is a sectional view taken transversely of the device at one end thereof; and Fig. 4 is a perspective view illustrating the device in cooperative relation with an air-heating device, such as a radiator of a hot water heating system.

Referring particularly to Figs. 1 to 3 of the drawing, the air-humidifying device comprises a casing having a container-like body 1 and a removable lid or cover 2. The body of the casing is formed so as to provide a liquid reservoir 3 at one end thereof and a chamber or compartment 4 adjacent the reservoir, the two being separated by an intermediate wall 5. The end wall 6 of the casing is provided with a suitable air ingress opening 7 and adjacent the wall 6 there is provided an air ingress passage 8 which leads into the device from the bottom at one end as shown clearly in Fig. 2. The cover or lid 2 serves to close the top of the air ingress passage 8 but terminates short of the opposite end wall 9 of the casing to provide an air egress passage 10 at the top of the device at one end thereof through which the moistened or humidified air is dispelled into the outside atmosphere.

The reservoir 3 is supplied with liquid, such as water, through a supply pipe 11 and the level of the liquid in the reservoir is preferably automatically maintained at a predetermined height by a float valve 12. One or more brushes 13 having radially-extending bristles are positioned within the reservoir in predetermined relation to the liquid contained therein. In the present instance, two such brushes are shown but it will be understood that any number of brushes may be used. The brushes may be constructed in any suitable manner and should preferably be provided with relatively stiff bristles. The bristles may be stiff hair bristles or stiff metallic bristles or they may be constructed of any other suitable material. Preferably a plurality of spaced rows or sets of radially-extending bristles 13 are provided, and are mounted on a hub portion secured to an end of the shaft 14, with uninterrupted annular spaces between the said spaced rows or sets of bristles. It has been found by repeated experiment that by so spacing the bristles or sets of bristles on the hub portion as to provide the uninterrupted annular spaces between the rows or sets of bristles, the device operates far more effectively and efficiently in the generation of a fine mist or vapor than does a construction which includes a single solid brush whose contacting surface is of the same extent as the aggregate contacting surfaces of the spaced rows or sets of bristles.

The brushes are carried by the imperforate hub at the end of the shaft 14 which extends through the dividing wall 5. Each of the brush sections comprises closely adjacent radial bristles which form a wall that is substantially impervious to air with the outer ends of the bristles forming a rough circumferential surface of predetermined width. This construction of the brush sections and the annular spaces between them cause the device to generate an extremely fine mist or vapor. The shaft is rotatable by a suitable device, such as an electric motor 15, disposed within the chamber 4. A fan or blower 16 of any suitable construction is carried at the other end of shaft 14 adjacent the air ingress opening 7 in wall 6, so that air from outside the device is sucked or propelled through the passage 8 and opening 7.

The peripheries of the rotary brushes 13 are so disposed relative to the liquid in the reservoir that when rotated at relatively high speed, the brushes set up a turbulent action and generate a fine mist or vapor. To this end, the brushes are preferably so disposed that the outer free ends of their bristles skim the surface of the liquid in the reservoir when the device is in operation, although some slight submersion of the bristles in the liquid during rotation is permissible. We have discovered that a rotary brush, when thus disposed and operated in cooperative relation with a body of liquid, effectively generates a very fine mist or vapor containing substantially no sizeable particles of liquid, this action being caused by the intense turbulent action thus produced. When dry air is brought into contact with the fine mist thus generated, maximum absorption of moisture by the air takes place. We have discovered further that the absorption of moisture by the air is best effected if the air is caused to flow toward the generated mist in a direction substantially parallel to the axis of the brush, or, in other words, at right angles to the generated whirl produced by the turbulent action. Accordingly, the device is so designed that the fan 16 propels the air in the direction indicated by the arrows in Fig. 2. The propelled air passes over wall 5 and into engagement with the generated mist. The moistened or humidified air which is thus produced then passes out through the air egress opening 10, as indicated by the arrows in Fig. 2.

Although there is little tendency of the device to produce vapor containing sizeable liquid particles, in order to break up any such particles as might be formed, a screen 17 of suitably fine mesh is positioned in the reservoir as clearly shown in Fig. 1. The direction of rotation of the brushes will be counterclockwise as viewed from the brush end of the device in Fig. 1. It will be seen that any sizeable liquid particles which might be produced will be thrown against the screen and will thus be atomized or collected on the screen from whence they will drop back into the liquid body.

Although there is little tendency for the generated mist or vapor to pass into chamber 4 owing to the force of the air flow into the reservoir, in order to insure against this, the portion 18 of wall 5, over which the air flows, is obliquely or slantingly disposed so as to form a shield and prevent any moisture from getting onto the parts of motor 15 which might be deleteriously affected thereby.

The liquid which is supplied to the device may be taken from any suitable source. Preferably, the device is of a portable nature and is adapted to be positioned upon a heating device such as a radiator as shown in Fig. 4. If the device is used in conjunction with a hot water heating system, the water supplied to the device may be taken directly from the system by connecting the device to the radiator, as by the pipe 19 shown in Fig. 4. This, of course, will be somewhat of a drain on the water of the heating system but such water may be periodically replenished either manually or by automatic means such as are now commonly employed. If the humidifying device is used in conjunction with a heating system other than a hot water system, such as a steam system, the water supply may be taken from any other suitable source. When the device is used in conjunction with an air-heating device, the air which passes through the humidifying device is preheated and this materially enhances the moisture absorption. By having the humidifying device adapted to be placed upon a radiator, as illustrated, and by having the air ingress opening leading into the device from the bottom, it is insured that the air supplied to the device is in the best condition for moisture absorption which is the case when the air has just passed upward in contact with the radiator surface.

We have found that a small device of this nature which occupies only a portion of the top surface of an average sized radiator is sufficient to maintain the humidity at a desired value in an average sized housing or dwelling. Due to its efficiency, the device may be made small and compact for usual purposes. The device will, of course, be operated intermittently and the operation may be controlled either manually or automatically. Preferably, the device will be controlled automatically by a suitable humidostat or like control device functioning to close the energizing circuit of the motor when the humidity of the air falls to a predetermined value and to deenergize the motor when the device has operated sufficiently to raise the humidity to a desired value. Such control devices are conventional and need no illustration or further discussion.

Although a preferred form of the device has been illustrated and described herein for the purpose of disclosure, it will be understood that various modifications and changes in the details of the device may be made without departing from the invention.

We claim:

1. In an air-humidifying device, a liquid reservoir, rotatable brush means arranged cooperatively with the liquid in the reservoir, said brush means comprising a plurality of annular brush sections spaced axially along an imperforate hub with uninterrupted annular spaces extending between said sections, each of said brush sections comprising closely adjacent radial bristles forming a wall that is substantially impervious to air with the outer ends of the bristles forming a rough circumferential surface of predetermined width, said brush sections being arranged so that the outer ends of the bristles substantially skim the surface of the liquid in the reservoir when the device is in operation, means for rotating said brush means at relatively high speed to generate a fine mist or vapor by contact between said rotating brush means and the liquid in the reservoir, and means for bringing air into intimate association with the generated mist, whereby absorption of moisture by the air is effected.

2. In an air-humidifying device, a liquid reservoir, rotatable brush means arranged cooperatively with the liquid in the reservoir, said brush means comprising a plurality of annular brush sections spaced axially along an imperforate hub with uninterrupted annular spaces extending between said sections, each of said brush sections comprising closely adjacent radially-extending stiff bristles forming a wall that is substantially impervious to air with the outer ends of the bristles forming a rough circumferential surface of predetermined width, said brush sections being arranged so that the outer ends of the bristles substantially skim the surface of the liquid in the reservoir when the device is in operation, means for rotating said brush means at relatively high speed to generate a fine mist or vapor by contact between said rotating brush means and the liquid in the reservoir, and means operable by said last means for forcing air into intimate association with the generated mist, whereby absorption of moisture by the air is effected.

3. In an air-humidifying device, a liquid reservoir, rotatable brush means arranged cooperatively with the liquid in the reservoir, said brush means comprising a plurality of annular brush sections spaced axially along an imperforate hub with uninterrupted annular spaces extending between said sections, each of said brush sections comprising closely adjacent radially-extending stiff bristles forming a wall that is substantially impervious to air with the outer ends of the bristles forming a rough circumferential surface of predetermined width, said brush sections being arranged so that the outer ends of the bristles substantially skim the surface of the liquid in the reservoir when the device is in operation, means for rotating said brush means at relatively high speed to generate a fine mist or vapor by contact between said rotating brush means and the liquid in the reservoir, means operable by said last means for forcing air into intimate association with the generated mist, whereby absorption of moisture by the air is effected, and means for maintaining the liquid level in proper relation to said brush means.

JAMES S. DURNELL.
JOHN A. TIFFT.